United States Patent [19]

Inoue

[11] 4,392,042
[45] Jul. 5, 1983

[54] METHOD OF AND APPARATUS FOR ELECTROEROSIVELY WIRE-CUTTING A CONDUCTIVE WORKPIECE

[75] Inventor: Kiyoshi Inoue, Tokyo, Japan

[73] Assignee: Inoue-Japax Research Incorporated, Yokohama, Japan

[21] Appl. No.: 237,677

[22] Filed: Feb. 24, 1981

[30] Foreign Application Priority Data

Feb. 25, 1980 [JP] Japan ................................. 55-23062
Feb. 25, 1980 [JP] Japan ................................. 55-23063

[51] Int. Cl.$^3$ ................................................ B23P 1/02
[52] U.S. Cl. ................................ 219/69 W; 219/69 D; 219/69 V
[58] Field of Search ............. 219/69 W, 69 D, 69 M, 219/69 V

[56] References Cited

U.S. PATENT DOCUMENTS

| | | | |
|---|---|---|---|
| 2,766,364 | 10/1956 | Higgins et al. | 219/69 D |
| 3,564,190 | 2/1971 | Kandajan et al. | 219/69 M |
| 3,928,163 | 12/1975 | Ullmann et al. | 219/69 D |

FOREIGN PATENT DOCUMENTS

| | | | |
|---|---|---|---|
| 2721804 | 12/1977 | Fed. Rep. of Germany | 219/69 W |
| 787731 | 12/1957 | United Kingdom | 219/69 D |

Primary Examiner—C. C. Shaw
Attorney, Agent, or Firm—Karl F. Ross; Herbert Dubno

[57] ABSTRACT

An electroerosive contouring wire-cutting apparatus using a distilled or deionized water machining medium of a specific resistivity controlled to be in a range between $10^2$ and $10^5$ ohm-cm, and having abrasive particles of TiC, TiN, $B_4C$, BN, SiC, $Al_2O_3$ and/or $SiO_2$ of for example a particle size in the order of microns for delivery by the medium to the machining gap. A high-frequency vibration of a frequency of 1 kHz to 1 MHz is imparted to the wire electrode traveling through the workpiece in a direction transverse to the wire axis to enhance the combined electroerosive and abrasive actions at the machining gap. The machining medium is delivered by a nozzle, retrieved at a collector, and separated into its liquid and solid components in a separator. After deionizing the liquid and extracting the machining products, the abrasive particles and deionized water are mixed and recirculated through the nozzle.

4 Claims, 6 Drawing Figures

4,392,042

METHOD OF AND APPARATUS FOR ELECTROEROSIVELY WIRE-CUTTING A CONDUCTIVE WORKPIECE

FIELD OF THE INVENTION

The present invention relates to an apparatus for electroerosively wire-cutting an electrically conductive workpiece to form a desired contour therein wherein a water medium is continuously supplied into a machining gap defined between the workpiece and a wire electrode bridged under tension across supply and takeup sides and axially displaced continuously to travel between a pair of machining guide members while traversing the workpiece. A succession of electrical pulses are applied between the traveling wire electrode and the workpiece across the machining gap flushing with the water medium to produce time-spaced electrical discharges through the water medium, thereby electroerosively removing material from the workpiece. As material removal proceeds, the workpiece is displaced relative to the traveling wire electrode transversely to the axis thereof along a prescribed path to form the desired contour in the workpiece. The invention particularly relates to an improvement in the electroerosive wire-cutting apparatus of the type described.

BACKGROUND OF THE INVENTION

In the art of electroerosive wire-cutting defined above, a thin continuous wire or flamentary electrode is commonly employed which has a thickness as small as 0.005 to 0.5 mm. In addition, an extremely small gap must be formed between the workpiece and the traveling wire electrode. This condition unavoidably imposes a restriction on the desired smooth and sufficient passage of the water medium through the machining site. Thus, only a small fraction of the water medium supplied to the region of the workpiece juxtaposed with the traveling wire electrode is actually allowed to enter and flow through the machining gap at a limited flow rate. Difficulty therefore arises for machining chips and gases produced at discharge sites to be carried away smoothly. As a result, arcing and short-circuiting tend to develop between the workpiece and the wire electrode to disturb the progress of cutting and often causes breakage of the wire electrode and impairs the cutting stability.

OBJECT OF THE INVENTION

It is accordingly an important object of the invention to provide an improved apparatus for electroerosively wire-cutting an electrically conductive workpiece in the manner described, which permits the workpiece to be machined with increased stability and efficiency, and with less tendency towards the wire breakage.

Other objects will become apparent as the description which follows proceeds.

SUMMARY OF THE INVENTION

The invention is directed to the electroerosively wire-cutting of an electrically conductive workpiece to form a desired contour therein, in which method a water medium is continuously supplied to a machining gap defined between the workpiece and a wire electrode bridged under tension across supply and takeup sides and axially displaced continuously to travel between a pair of machining guide members while traversing the workpiece, a succession of electrical pulses are applied between the traveling wire electrode and the workpiece across the machining gap flushed with the water medium to produce time-spaced electrical discharges through the water medium, thereby electroerosively removing material from the workpiece, and the workpiece is displaced relative to the traveling wire electrode transversely to the axis thereof along a prescribed path to form the desired contour in the workpiece. In this method there are included the steps of controlling the specific resistivity of the water medium to be in a range between $10^2$ and $10^5$ ohm-cm and introducing abrasive particles into the water medium supplied to the machining gap.

In accordance with a further important feature of the present invention, a vibration of a frequency in the range between 100 Hz and 1 MHz, preferably not less then 1 kHz and with an amplitude between 1 and 50 microns, preferably not greater than 10 microns, is imparted intermediate the said machining guide members to the traveling wire electrode in a direction transverse to the axis thereof so that the traveling wire electrode acquires an undulating oscillatory motion along the axis with more than two nodes and antinodes or loops with the amplitude at most smaller than the size of the machining gap in the said direction.

The vibration may be imparted to the traveling wire electrode by disposing an electrochemical transducer energized by a high-frequency power supply and disposed in a contacting relationship with a stretch of the wire electrode supported between the guide members. A pair of such transducers may be disposed one on one side of the workpiece and the other on the other side of the workpiece so that the two vibrations, preferably with different frequencies or modes, are superimposed upon each other as applied to the traveling wire electrode. The electromechanical transducer or each of the electromechanical transducers may be in the form of a disk and the wire electrode may be passed through the disk in the region of a center thereof in the direction of its thickness.

Thus the apparatus for electroerosively wire-cutting an electrically conductive workpiece to form a desired contour therein, comprises means for continuously supplying a water medium into a machining gap defined between the workpiece and a wire electrode supported under tension across supply and takeup sides and axially displaced continuously to travel between a pair of machining guide members while traversing the workpiece, power supply means for applying a succession of electrical pulses across the machining gap flushed with the water medium between the workpiece and the wire electrode to produce time-spaced electrical discharges through the water medium, thereby electroerosively removing material from the workpiece and contouring feed means for displacing the workpiece relative to the traveling wire electrode transverse to the axis thereof along a predetermined path to form the desired contour in the workpiece. The apparatus also includes ion-exchange means for controlling the specific resistivity of the water medium for delivery to the machining gap by the said supply means to be in a range between $10^2$ and $10^5$ ohm-cm and means for introducing abrasive particles into the resistivity-controlled water medium for delivery to the machining gap.

In accordance with a further feature of the apparatus aspect of the invention, means is provided for imparting a vibration of a frequency in the range between 100 Hz and 1 MHz, preferably not less than 1 kHz an with an amplitude between 1 and 50 microns, preferably not greater than 10 microns intermediate the machining guide members to the traveling wire electrode in a direction transverse to the axis thereof so that the traveling wire electrode acquires an undulating oscillatory motion along the axis with more than two nodes and antinodes or loops with the amplitude at most smaller than the size of the machining gap in the said direction.

The vibration means may include an electromechanical transducer energized by a high-frequency power supply and disposed in a contacting relationship with a stretch of the wire electrode supported between the guide members. A pair of such transducers may be disposed one on one side of the workpiece and the other on the other side of the workpiece so that the two vibrations, preferably with different frequencies or modes, are superimposed upon each other as applied to the traveling wire electrode. The two vibrations effectively create in the traveling wire a beat or the periodic vibrations in amplitude of a wave that is the superimposition of the corresponding two simple harmonic waves of the different frequencies. The electromechanical transducer or each of the two electromechanical transducers may be in the form of a disk and the wire electrode may be passed through the disk in the region of a center thereof in the direction of its thickness.

BRIEF DESCRIPTION OF THE DRAWING

These and other objects, features and advantages of the present invention will become more readily apparent from the following description of certain embodiments thereof as taken with reference to the accompanying drawing in which.

SPECIFIC DESCRIPTION

Figure 1:
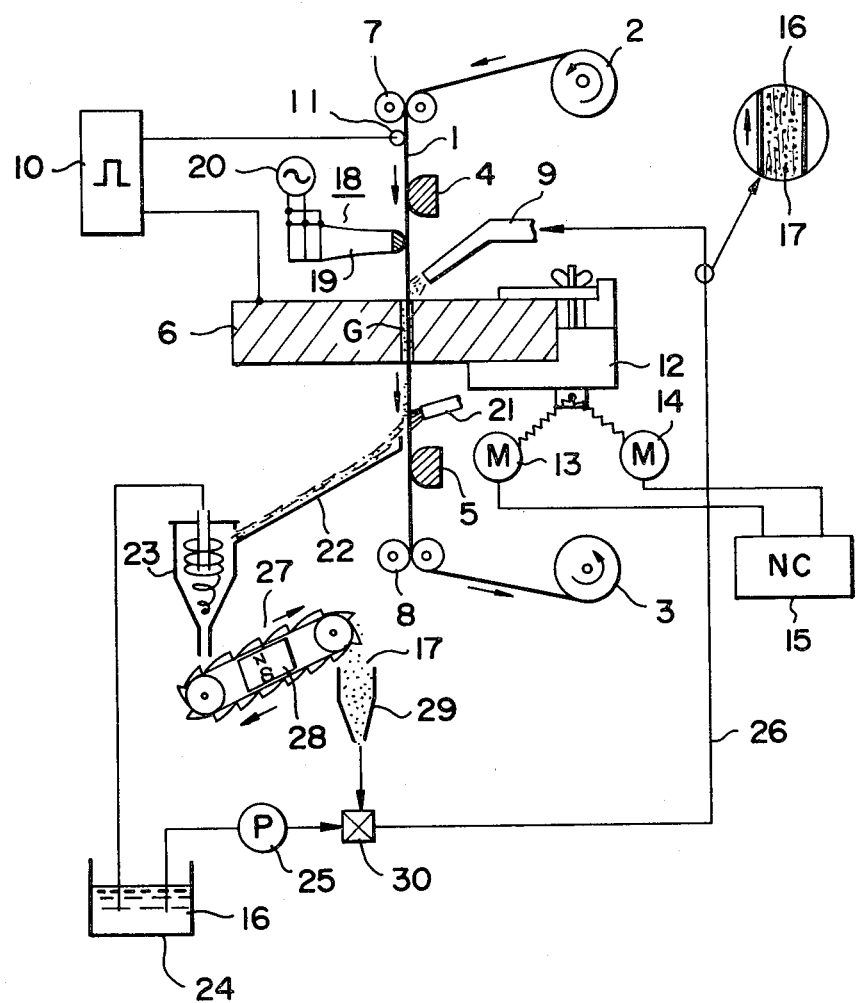
FIG. 1 is a schematic view of a wire-cutting electroerosion arrangement embodying the principles of the present invention.

Referring to FIG. 1, an electroerosive wire-cutting arrangement according to the invention includes a wire electrode 1 composed of, e.g., copper or brass and having a diameter of 0.005 to 0.5 mm, preferably not greater than 0.1 mm. The wire electrode 1 is axially advanced from its supply side shown in the form of a supply reel 2 to its takeup side shown in the form of a takeup reel 3 continuously through a cutting zone defined between a pair of machining guide members 4 and 5. A workpiece 6 is disposed in the cutting zone and traversed by a linear stretch of the wire electrode 1 tightly bridged across and continuouslly traveling between the machining guide members 4 and 5. Further guide means 7 and 8 are provided in the path of wire travel to change the direction of advance of the wire electrode 1 from the supply side 2 to the cutting zone and from the latter to the takeup side 3, respectively. The axial displacement of the wire electrode 1 at an appropriate rate and under an appropriate tension may be effected by drive means disposed between the guide 8 and the takeup reel 3 and brake means disposed between the supply reel 2 and the guide 7.

In the cutting zone, a mixture of a water machining medium 16 and abrasive particles 17 is continuously supplied from a nozzle 9 into a machining gap G formed between the workpiece 6 and the traveling wire electrode 1. An EDM (electrical discharge machining) power supply 10 is electrically connected on one hand to the workpiece 6 and on the other hand to the wire electrode 1 via a brush 11 to apply a succession of EDM pulses across the machining gap G through the water medium to electroerosively remove material from the workpiece 6. The water medium 16 should, for the purposes of the invention, be of a specific resistivity in the range between $10^2$ and $10^5$ ohm-cm.

The workpiece 6 is securely mounted on a worktable 12 and a contour-feed drive system for displacing the workpiece 6 relative to the wire electrode 1 transversely to the axis thereof or in an X-Y plane includes a first motor 13 for feeding the worktable 12 along the X-axis and a second motor 14 for feeding the worktable 12 along the Y-axis. A numerical controller 15 is provided having data for a prescribed contour-feed path preprogrammed therein. The data are reproduced and the corresponding drive signals are furnished from the numerical controller 15 to the motors 13 and 14 to displace the workpiece 6 relative to the wire electrode 1 along the prescribed path so that a desired contour is machined in the workpiece.

The abrasive particles 17 should preferably be composed of TiC, TiN, TiB, $TiB_2$, $(TiB_2)C$, $(TiB_2)N$, HfC, $HfB_2$, TiCN, TiHfC, $B_4C$, BN, SiC, $Al_2O_3$ and/or $SiO_2$ and of a particle size in the order of microns, preferably between 1 and 100 $\mu m\phi$ and still favorably not greater than 50 $\mu m\phi$. These particles supplied in suspension with the water medium 16 are forced to enter into the gap spacing G and there act to abrade the workpiece contour surface being eroded by electrical discharges as they are carried by the traveling wire electrode 1. Thus, the mechanical abrading action is added to the electroerosive action, giving rise to a marked increase in material removal from the workpiece 6. The abrasive particles dynamically moving through the machining gap G also act to mechanically carry away the machining chips and other gap products formed by the electroerosive action and at the same time serve as a spacer between the traveling wire electrode 1 and the workpiece 6 to prevent them from direct contact or short-circuiting The results are a marked increase in the cutting efficiency and performance, and an increased operational stability practically without arcing and with less intensity towards wire breakage.

In addition or optionally, a vibrator unit 18 comprising an electromechanical transducer assembly 19 energized by a high-frequency power supply 20 is provided. The assembly 19 is shown having an amplifying horn portion whose tip is disposed in a contacting relationship with the wire electrode 1 traveling through the cutting zone defined between the guide members 4 and 5. The transducer 19 is energized by the power supply 20 having a frequency not less than 100 Hz, preferably not less than 1 kHz and up to 1 MHz to impart to the traveling wire 1 stretch between the guide means 4 and 5, a vibration of an amplitude preferably between 1 and 50 microns and still more preferably between 1 and 10 microns. The vibration is imparted to the wire electrode in a direction transverse to the axis thereof so that an undulating oscillatory motion with more than two nodes and antinodes or loops is provided in the wire 1 traveling between the guide members 4 and 5 positioned at opposite sides with respect to the workpiece 6. This vibration creates a highly faborable pumping action for the mixture of the water medium 16 and the abrasive particles 17 which can thus be entrained on the traveling wire electrode 1 into the machining site G at an increased volume rate of flow. Since the water medium 16 and the abrasive particles 17 are thus carried into the machining site G at an increased smoothness, a still further increase in the material-removal rate is achieved. The pumping action also serves to carry away the machining and other gap products at an increased smoothness from the gap site G to assure continuation of the steady machining operation.

The mixture of water medium and abrasive particles leaving from the workpiece 6 with the traveling wire 1 is directed with a stream of clean water medium supplied from a nozzle 21 disposed below the workpiece 6 onto a trough 22. The mixture with the clean water medium is introduced in a centrifugal separator 23 where it is separated into a liquid (water medium) and solid particles (abrasive particles and machining chips). The liquid is led into a vessel 24 for temporary storage therein and then forced by a pump 25 to flow into a conduit 26 leading to the supply and dispensing nozzle 9. The solid particles from the centrifugal separator 23 are led on a moving endless belt 27 which has a magnetic separator 28 disposed along its path to magnetically collect the machining chips. The abrasive particles 17 separated from the machining chips continue to be carried on the moving belt 27 and are collected into a funnel 29 and then are led to a mixing chamber 30 provided at a portion of the conduit 26. At the mixing chamber 30 the clean abrasive particles 17 and thus homogeneously mixed with the clean water medium 16 pumped from the vessel 24, the mixture being led via the conduit 26 to the nozzle 9 for delivery to the machining gap G. In the vessel 24 or at a portion of the conduit 26 upstream of the mixing chamber 30 there is provided an ion-exchange unit (not shown) for controlling the electrical specific resistivity of the water medium 16 to be in a range between $10^2$ amd $10^5$ ohm-cm.

EXAMPLE

A copper wire electrode of 0.02 mm$\phi$ is mounted in an arrangement generally of the type shown in FIG. 1 and displaced axially at a rate of travel of 2 m/min for electroerosively wire-cutting a workpiece composed of S55C material having a thickness of 11 mm. The water medium is tap water treated by an ion-exchanger to have a specific resistivity of $5 \times 10^4$ ohm-cm. The electroerosive machining pulses have an on-time $\tau$on of 10 microseconds, an off-time $\tau$off of 15 microseconds and a peak current of 56 amperes. Abrasive particles as suspended in the water medium are composed of SiC and have particle sizes of 600 meshes. They are mixed at a proportion of 15% by volume with the water medium. A vibration of 35 kHz is applied to the traveling wire electrode. Removal rates obtained for cases, viz. (A) without the abrasive particles and without wire vibration, (B) with abrasive particles and (C) with the abrasive particles and wire vibration are shown in the following table:

TABLE 1.

| Case | Removal Rate |
|------|--------------|
| A | 0.9 mm/min |
| B | 1.6 |
| C | 2.1 |

It is seen that an increase in removal rate amounting to or even more than two times is obtained according to the present invention. It should also be noted that with C, the contouring feed rate can be increased up to 30% compared with B. It is therefore apparent that the total machining time with the present invention is reduced to about or less than one half that with the prior art.

Instead of a single vibrator unit 19 as shown, two such vibrators may be provided, one on one side of the workpiece 6 and the other on the other side of the workpiece 6; they are preferably energized with different frequencies so that two resulting vibrations are superimposed upon one another to create a composite undulating oscillatory motion with more than two nodes and antinodes or loops in the wire 1.

Figure 3A:
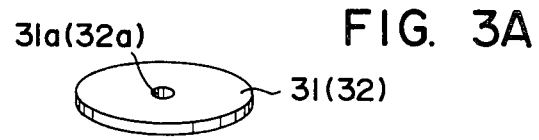
FIGS. 3A and 3B are perspective views of two different forms of the wire passage formed in the disk-shaped transducer in the embodiment of FIG. 2.
Figure 3B:
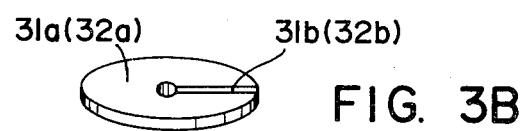
Figure 2:
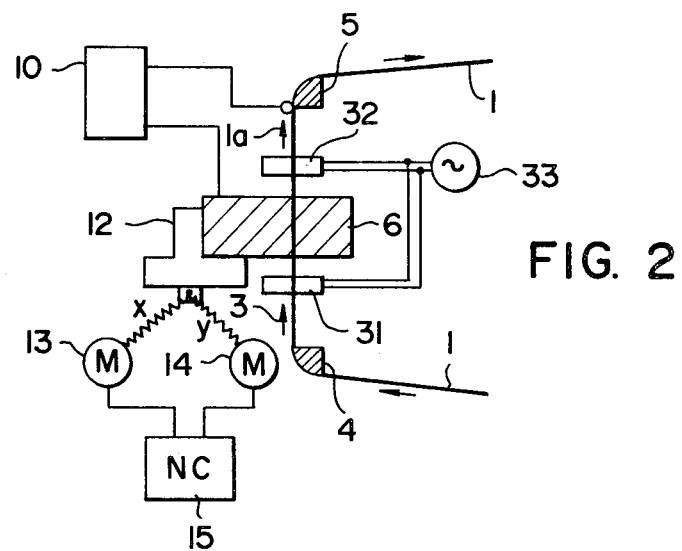
FIG. 2 is a modified wire-cutting electroerosion arrangement using a pair of disk-shaped electromechanical transducers for imparting high-frequency vibrations to the traveling wire electrode according to the invention.

FIG. 2 shows a modified vibration system in an electroerosive wire-cutting arrangement in which some of the parts or elements the same as those in FIG. 1 are referred to by the same reference numerals and some are omitted to avoid duplication. The vibration system shown in FIG. 2 makes use of one or two disk-shaped electromechanical transducers 31 and 32, instead of a horn structure as shown in FIG. 1, the transducers 31 and 32 being energized by a common high-frequency power supply 33. The transducers 31 and 32 each comprise a disk formed with a central opening 31a (32a) or with a slit 31b (32b) exterding between the center and the periphery thereof as shown in FIGS. 3A and 3B, respectively, which serves as a passageway for the traveling wire electrode 1. When each of the disk transducers 31 and 32 is energized by the high-frequency power supply 33, a high-frequency mechanical vibration is generated therein and imparted to the traveling wire electrode 1. Since each teransducer 31, 32 is disposed in a contacting relationship with the wire stretch 1a between the machining guide members 4 and 5, an undulatory oscillatory motion develops in the wire stretch 1a which thus acquires an external mechanical vibration in a direction transverse to the axis thereof in the manner previously described.

Each of the transducers 31 and 32 may, as in the assembly 19 of FIG. 1, be composed of quarz, lithium tantanate, barium titanate, lead zircon-titanate or the like known transducer material and is energized to produce a high-frequency mechanical vibration in the direction of its radius. The disk form of vibrator is particularly advantageous in that it can be mounted in close proximity to the workpiece 6 and hence the machining site.

Figure 4:
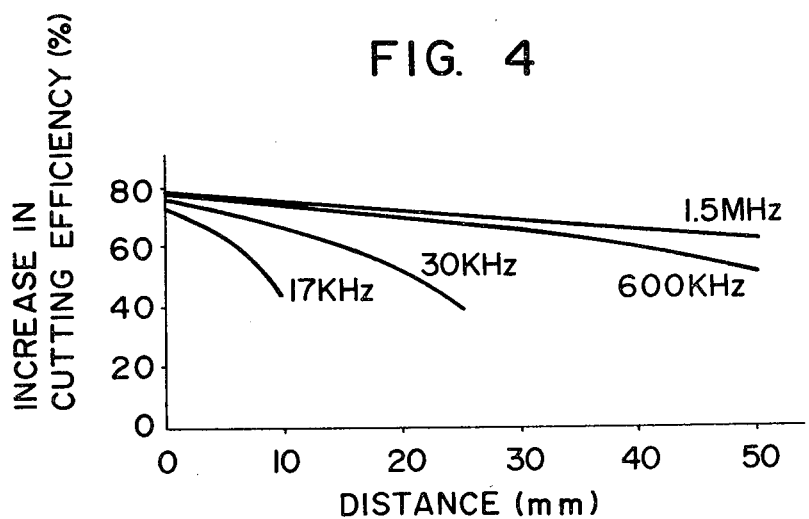
FIG. 4 is a graph showing the increase in machining efficiency versus the distance between the transducer and the workpiece.

FIG. 4 is a graph showing experimental results wherein the increase in cutting efficiency is plotted along the ordinate and the distance of the location of an electromechanical transducer away from the workpiece 6 is plotted along the abscissa. The graph shows that a vibration frequency in excess of 100 kHz is preferred and is advantageous to achieve an increase in the cutting efficiency with the greater distance but a shorter distance is preferred generally to attain a greater increase in the cutting efficiency.

Figure 5:
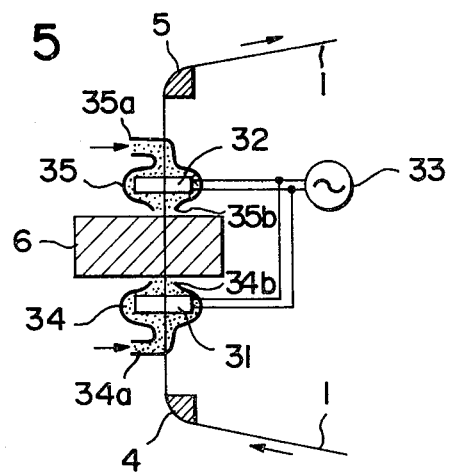
FIG. 5 is a further arrangement of electromechanical transducers according to the invention.

In a further embodiment of the invention shown in FIG. 5, each of the disk vibrators 31 and 32 traversed by the traveling wire electrode 1 is received in a plenum chamber 34, 35 supplied with a mixture of the water medium and abrasive particles already described. Each of the chamber 34 and 35 has an inlet 34a (35a) leading to the conduit 26 shown in FIG. 1 and an outlet 34b (35b) disposed in close proximity to the working region for delivering the water/abrasive mixture into the machining gap. The water medium in the mixture here also effectively serves to cool the vibrator body 31, 32 thereby assuring the operational stability of these units.

There is thus provided an improved method of and apparatus for electroerosively wire-cutting an electrically conductive workpiece whereby a marked enhancement in the machining performance, efficiency and operational stability is achieved.

What is claimed is:

1. In an apparatus for electroerosively wire-cutting an electrically conductive workpiece to form a desired contour therein, including supply means for continuously supplying a water machining medium into a machining gap defined between the workpiece and a wire electrode supported under tension across supply and takeup sides and axially displaced continuously to travel between a pair of machining guide members while traversing the workpiece, power supply means for applying a succession of electrical pulses across the machining gap flushed with the water medium between the workpiece and the wire electrode to produce time-spaced electrical discharges through the water medium, thereby electroerosively removing material from the workpiece and contouring feed means for displacing the workpiece relative to the traveling wire electrode transversely to the axis thereof along a predetermined path to form the desired contour in the workpiece, the improvement comprising:

ion-exchanger means for controlling the specific resistivity of the water medium delivered by said supply means to the machining gap to be in a range between $10^2$ and $10^5$ ohm-cm means for introducing abrasive particles into said resistivity-controlled water medium for delivery in suspension therein to said machining gap;

collecting means for receiving the mixture of said water medium and said abrasive particles leaving said machining gap;

first separator means for separating said collected mixture into a liquid component and a solid component;

second separator means for separating said solid component into machining products from said machining gap and abrasive particles;

means for guiding said liquid component to said ion-exchanger means for processing thereby to yield said water medium of said specific resistivity;

mixing means for introducing said abrasive particles yielded from said second separator means into said water medium yielded from said ion-exchanger means; and conduit means for guiding the mixture of said water medium and said abrasive particles from said mixing means to said supply means.

2. The improvement defined in claim 1, further comprising means for imparting a vibration of a frequency in the range between 100 Hz and 1 MHz to the traveling wire electrode in a direction transverse to the axis thereof.

3. The improvement defined in claim 2 wherein said means for imparting a vibration includes at least one electromechanical transducer disposed intermediate between said machining guide members and being in the form of a disk having an opening through which said traveling wire electrode passes.

4. The improvement defined in claim 3 wherein said supply means comprises a plenum chamber supplied with the mixture of said water medium and said abrasive particles and adapted to receive said electromechanical transducer therein.

* * * * *